Figure 1:
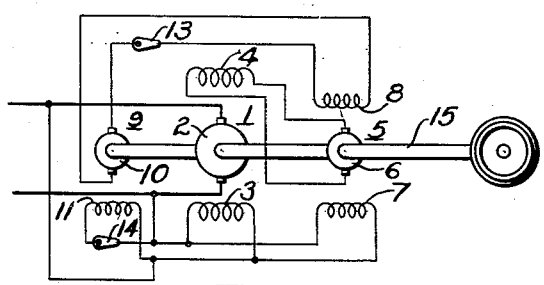

May 13, 1924.

R. E. FERRIS

SYSTEM OF CONTROL

Filed April 12, 1921

INVENTOR
Ralph E Ferris.
BY
ATTORNEY

Patented May 13, 1924.

1,493,851

UNITED STATES PATENT OFFICE.

RALPH E. FERRIS, OF EDGEWOOD, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed April 12, 1921. Serial No. 460,682.

*To all whom it may concern:*

Be it known that I, RALPH E. FERRIS, a citizen of the United States, and a resident of Edgewood, in the county of Allegheny and State of Pennsylvania, have invented a new and useful Improvement in Systems of Control, of which the following is a specification.

My invention relates to systems of control for dynamo-electric machines adapted to generate electric currents and particularly to means for securing substantially constant potential regardless of the speed at which the generators are driven.

One object of my invention is to provide a control system which shall automatically maintain the voltage generated by a dynamo-electric machine substantially constant.

A second object of my invention is to provide a main generator with a plurality of exciting generators which shall maintain the delivered voltage of the main generator substantially constant through a wide range of speed thereof and then shall raise or lower the generated voltage according to whether an even or an odd number of exciting generators is employed.

Another object of my invention is to provide a control system for a generator which will maintain the voltage generated by it substantially constant, although a constant source of voltage is not required for exciting the field-magnet winding of the generator.

A further object of my invention is to provide a dynamo-electric machine having a plurality of field-magnet windings and magnetic circuits therefor, the magnetic circuits being magnetically insulated the one from the other.

Heretofore, control systems have been provided for maintaining the voltage of a generator at substantially constant potential regardless of the speed at which the armature of the generator has been driven but it has been necessary to employ means for energizing a field-magnet winding of the generator at substantially constant potential to effect this result.

Briefly speaking, my invention consists in providing a main generator having a plurality of field-magnet windings and separate magnetic circuits therefor and one or more exciting generators having a plurality of field-magnet windings and separate magnetic circuits therefor. One of the field-magnet windings of the main generator and one of the field-magnet windings of each of the exciters are energized sufficiently to saturate their respective magnetic circuits. One of the field-magnet windings of the main generator and one of the field-magnet windings of each of the exciting generators, except one, are energized by a subsequent exciting generator, the energization of each of the field-magnet windings thus excited being in opposition to that of the field-magnet windings having magnetic circuits which are saturated.

Figure 2:
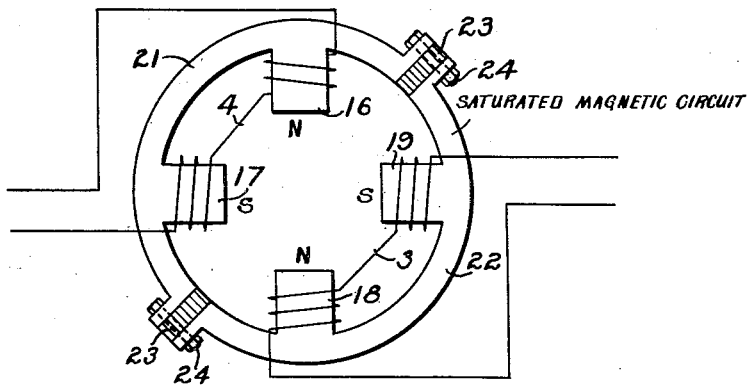
Figure 3:
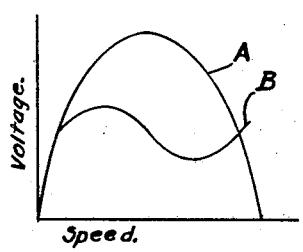
Figure 4:
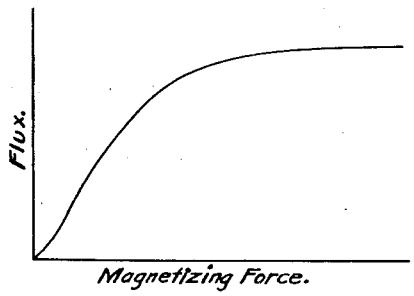

For a better understanding of my invention, reference may be made to the accompanying drawing, Figure 1 of which is a diagrammatic view of a main generator and a plurality of exciters driven by a common shaft, such, for example, as the axle of a railway vehicle;

Fig. 2 is a diagrammatic view of a dynamo-electric machine having a plurality of windings which are magnetically insulated the one from the other, in accordance with my invention;

Fig. 3 is a chart having a number of curves illustrating the effect of variations in speed upon the voltage of a main generator, according to the number of exciters employed to govern the excitation of one of its field-magnet windings and Fig. 4 is a diagram showing the effect upon the magnetic circuit of a motor of increasing the magnetizing force therefor after the magnetic circuit has become saturated.

Referring particularly to Fig. 1 of the drawing, a power system for generating current at substantially constant potential, such, for example, as is required for a car-lighting system or for the field-magnet winding of a dynamo-electric machine, comprises a main generator 1 having an armature 2 and a plurality of field-magnet windings 3 and 4, an exciting generator 5 having an armature 6 and field-magnet windings 7 and 8, a second exciting generator 9 having an armature 10 and a field-magnet winding 11, and a plurality of switches 13 and 14 for governing the armature circuit 10 and a field-magnet winding 11 of the generator 9, respectively.

The armatures 2, 6 and 10 are shown mounted upon a common shaft or car axle 15 but any other well-known means of connecting the armatures to the car axle may be employed, providing the ratio of the speeds of the armatures 2, 6 and 10 of the generators 1, 5 and 9 is maintained constant.

The field-magnet windings 3, 7 and 11 of the generators 1, 5 and 9, respectively, are energized by current from the armature 2 of the generator 1. Any other source of electrical energy may be employed for energizing the field-magnet windings 3, 7 and 11, provided that the excitation is sufficient to saturate the respective magnetic circuits of said windings. It is considered most convenient, however, to have the main generator supply the necessary current for energizing these windings.

The field-magnet windings 3 and 4 of the main generator 1 and the field-magnet windings 7 and 8 of the exciter or exciting generator 5 are wound upon separate magnetic pole pieces in such manner that the two windings of each generator will magnetically oppose each other when energized. The field-magnet winding 4 of the main generator 1 is energized by the exciter 5 and the field-magnet winding 8 of the exciter 5 is energized by the exciter 9.

Referring more particularly to Fig. 2 of the drawing, the field-magnet windings 3 and 4 of the main generator 1 are shown wound upon pole-pieces 16 and 17, and 18 and 19, respectively. The pole-pieces 16 and 17 form part of an integral magnetizable yoke or frame 21 and pole-pieces 18 and 19 form part of an integral magnetizable yoke or frame 22.

The yokes or frames 21 and 22 are magnetically insulated from each other by a plurality of non-magnetizable members 23 which are made from brass or any other suitable material. The frames 21 and 22 are secured to each other by means of bolts 24 which are likewise made of some non-magnetic material, such, for example, as bronze. The winding 3 and the pole-pieces 18 and 19 are so designed that, when the generator 1 is generating current at substantially normal voltage, the magnetic circuit comprising the pole-pieces 18 and 19 and the frame 22 becomes saturated.

The exciter 5 has its windings 7 and 8 wound upon pole-pieces forming portions of a plurality of frames substantially similar to those shown for the main generator 1. The effect of an increased magnetizing force caused by the increased energization of the winding 3 of the generator 1 upon the magnetic circuit comprising pole-pieces 18 and 19 and the frame 22, after saturation thereof, is illustrated by Fig. 4 of the drawing, in which the magnetizing force is represented by the abscissæ, and the magnetic flux is represented by the ordinates. It will be apparent that, after the magnetic circuit is saturated, the flux density no longer rapidly increases regardless of a change in voltage across the terminals of the field-magnet windings.

As the voltage generated by a dynamo-electric machine is directly proportional to the strength of the magnetic flux of its field-magnet circuit, it is apparent that, if the magnetic circuit becomes saturated, the voltage will vary directly as the speed of the armature of the generator, which will be the only variable element.

Referring again to Fig. 1 of the drawing, if only the field-magnet winding 3 is energized and it is energized sufficiently to saturate its magnetic circuit, then the voltage across the terminals of the armature 2 will vary directly as the speed of the armature 2. If the field-magnet winding 7 of the exciter 5 is energized sufficiently to saturate its magnetic circuit, then the voltage generated across the terminals of the armature 6 of the exciter 5 will be directly proportional to the speed of the armature 6 or the shaft 15 by which it is driven. Therefore, the energization of the field-magnet winding 4 of the generator 1 will be increased as the speed of the shaft 15 is increased. As the field-magnet winding 4 energizes the magnetic circuit, which tends to generate current in the armature 2 in opposition to that generated by the magnetization set up by the magnetic circuit associated with the field-magnet winding 3, the effect of energization of the field-magnet winding 4 will be to compensate for the increased speed of the armature 2.

The resultant of the magnetic field established by the field-magnet windings 3 and 4 grows less as the speed of the armature increases. Therefore, by designing the field-magnet windings 3 and 4 and their respective magnetic circuits properly they will substantially compensate for any change in speed of the main generator 1. However, if the energization of the field-magnet winding 4 is sufficient to establish a magnetic circuit having a stronger magnetic field than that produced by the field-magnet winding 3, this condition will result in the current generated by the armature 2 reversing its direction.

This result is illustrated by Figure 3 of the drawing, in which curve "A" represents the voltage generated by the generator 1 at various speeds, when the field-magnet winding 8 of the exciter is de-energized, the voltage and the speed of the generator 1 being represented by the ordinates and abscissæ of the diagram, respectively.

If the field-magnet winding 8 of the exciter 5 is energized by the exciter 9, the effect upon the voltage across the terminals of the armature 2 of the generator 1 is shown by curve "B" of Fig. 3, for, as the speed of the shaft 15 increases, the current generated by the exciter 9 increases in potential, thereby increasing the excitation of the field-magnet winding 8 and thus decreasing the resultant effect of the field-magnet windings 7 and 8. This decrease may be substantially proportional to the increase in speed of the shaft 15. The effect of the exciter 5 having opposing magnetic circuits will be to lessen the change in voltage across the terminals of the field-magnet winding 4 of the generator 1 upon an increase in speed of the shaft 15.

It is apparent that, if the excitation of the field-magnet winding 8 is sufficient to overcome that of the field-magnet winding 7 and thus reverse the voltage across the terminals of the armature 6 of the exciter 5, the current in field-magnet winding 4 will be reversed and the magnetic field established thereby will no longer oppose that established by the field-magnet winding 3 but will assist it. In this way, the voltage across the armature 2 of the main generator 1 is caused to increase rapidly upon a further increase in the speed of the shaft 15, as both the speed of the armature 2 and the strength of the magnetic field will be increasing simultaneously.

It is apparent that not having to maintain a constant voltage across the terminals of the field-magnet windings 3, 7 and 11 of the main generator 1 and the exciters 5 and 9, respectively, is of great advantage, as the system would otherwise require some source of substantially constant potential, such, for example, as batteries. If batteries were employed, it would necessitate recharging from time to time and also frequent inspection and renewal.

While I have illustrated my invention by mounting the generator upon the axle of a railway vehicle for lighting the vehicle or exciting the field-magnet winding of the driving motors, it is apparent that the generator might likewise be employed for generating current, wherever substantially constant voltage is required, such, for example, as in a farm-lighting system. It is evident that further modifications may be made in the design of the dynamo-electric machine and the circuits therefor without departing from the spirit of my invention. I desire, therefore, that only such limitations shall be imposed as are indicated by the scope of the appended claims.

I claim as my invention:

1. The combination with a main generator having a plurality of field-magnet windings and magnetic circuits therefor, of an exciting generator having a field-magnet winding and a magnetic circuit therefor, and means for saturating the magnetic circuit of a field-magnet winding of said main generator and for saturating the magnetic circuit of the field-magnet winding of said exciting generator.

2. The combination with a main generator having a plurality of field-magnet windings and magnetic circuits therefor, of an exciting generator for energizing one of said field-magnet windings, said exciting generator having a field-magnet winding and a magnetic circuit therefor, and means for saturating a magnetic circuit of said main generator and of said exciting generator.

3. The combination with a main generator having a plurality of field-magnet windings and magnetic circuits therefor, of an exciting generator for energizing one of said field-magnet windings, said exciting generator having a field-magnet winding and a magnetic circuit therefor, means for saturating a magnetic circuit of said main generator and a magnetic circuit of said exciting generator and means for maintaining the ratio of speed between said main generator and said exciting generator substantially constant.

4. In a control system, the combination with a plurality of generators having armatures, field-magnet windings and magnetic circuits therefor, of means for exciting one field-magnet winding of each generator to saturate the magnetic circuit corresponding thereto and means for connecting each succeeding generator to differentially excite a field-magnet winding of the preceding generator, thereby producing a voltage in the first generator that is substantially constant through a predetermined range of speed and is then raised or lowered according as the number of generators is odd or even.

5. In a control system, the combination with a main generator having an armature, field-magnet windings and magnetic circuits therefor, of a plurality of exciting generators having armatures, field-magnet windings and magnetic circuits therefor, means for effecting common rotation of all of said armatures, means for energizing one field-magnet winding of each succeeding generator from the preceding generator, said main generator comprising a source of energy for saturating the magnetic circuit of a field-magnet winding of each generator.

6. A plurality of generators having commonly driven armatures and severally having a plurality of field-magnet windings and magnetic circuits therefor, another generator having an armature rotatable with the others and having a single field-magnet winding and a magnetic circuit therefor, means for exciting one field-magnet winding of each generator to saturate the corresponding magnetic circuit and means for connecting each succeeding armature to excite a field-magnet winding of the preceding generator.

7. In a control system, the combination with a main generator having an armature, two field-magnet windings and magnetic circuits therefor, of an exciting generator having an armature, two field-magnet windings and magnetic circuits therefor, a second exciting generator having an armature, one field-magnet winding and a magnetic circuit therefor, means for energizing one winding of said main generator and one winding of each of said exciting generators to saturate the corresponding magnetic circuits of said main and said exciting generators, and means for exciting one field-magnet winding of said first exciting generator by said second exciting generator whereby said main generator maintains a uniform voltage through a wide range of speed.

8. In a control system, the combination with a main generator having an armature and a plurality of field-magnet windings and separate magnetic circuits therefor, of a plurality of auxiliary generators each having an armature, one of said generators having a single field-magnet winding and another a plurality of field-magnet windings, said auxiliary generators exciting one of the field-magnet windings of different ones of said generators and each of said generators having one field-magnet winding energized by said main generator to saturate its corresponding magnetic circuit.

In testimony whereof, I have hereunto subscribed my name this 31st day of March, 1921.

RALPH E. FERRIS.